United States Patent
Bangur et al.

(10) Patent No.: US 10,983,820 B2
(45) Date of Patent: Apr. 20, 2021

(54) FAST PROVISIONING OF STORAGE BLOCKS IN THIN PROVISIONED VOLUMES FOR SUPPORTING LARGE NUMBERS OF SHORT-LIVED APPLICATIONS

(71) Applicant: International Business Machines Corporation, Armonk, NY (US)

(72) Inventors: Sandeep Bangur, Pune (IN); Pankaj Deshpande, Pune (IN); Aakanksha Mathur, Pune (IN); Pradip Waykos, Chikhali (IN)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 16/294,778

(22) Filed: Mar. 6, 2019

(65) Prior Publication Data
US 2020/0285497 A1 Sep. 10, 2020

(51) Int. Cl.
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/067* (2013.01); *G06F 3/0647* (2013.01); *G06F 2009/4557* (2013.01); *G06F 2009/45579* (2013.01); *G06F 2009/45583* (2013.01)

(58) Field of Classification Search
CPC .. G06F 9/45558; G06F 3/0604; G06F 3/0647; G06F 3/067; G06F 2009/4557; G06F 2009/45579; G06F 2009/45583
See application file for complete search history.

(56) References Cited

U.S. PATENT DOCUMENTS

| | | | |
|---|---|---|---|
| 7,577,692 B1 | 8/2009 | Corbett et al. | |
| 7,631,155 B1 * | 12/2009 | Bono | G06F 3/0608 711/156 |
| 7,849,098 B1 | 12/2010 | Scales et al. | |
| 8,650,359 B2 | 2/2014 | Vaghani et al. | |
| 9,383,924 B1 | 7/2016 | Fullbright et al. | |
| 2009/0248763 A1 | 10/2009 | Rajan et al. | |

(Continued)

OTHER PUBLICATIONS

Degioanni, L., "Why are containers so short-lived?" InfoWorld, The Container Intelligence Blog, Jul. 31, 2018, 6 pages, retrieved from https://www.infoworld.com/article/3293260/containers/why-are-containers-so-short-lived.html.

(Continued)

*Primary Examiner* — Charles Rones
*Assistant Examiner* — Hewy H Li
(74) *Attorney, Agent, or Firm* — Zilka-Kotab, P.C.

(57) ABSTRACT

A computer-implemented method includes receiving a request for storage for a container and determining whether a suitable thin provisioned volume currently exists based on criteria in the request. In response to determining that a suitable thin provisioned volume currently exists, the method includes selecting an unused portion of the thin provisioned volume and creating a container volume in the selected unused portion of the thin provisioned volume. The method also includes permitting input/output (I/O) to the container volume and releasing the selected unused portion of the thin provisioned volume in response to determining the container volume is no longer needed.

18 Claims, 12 Drawing Sheets

(56) References Cited

U.S. PATENT DOCUMENTS

| | | | | |
|---|---|---|---|---|
| 2010/0082765 A1* | 4/2010 | Murase | ................ | G06F 3/0608 |
| | | | | 709/213 |
| 2013/0198466 A1* | 8/2013 | Kono | .................... | G06F 3/0631 |
| | | | | 711/161 |
| 2015/0365282 A1* | 12/2015 | Nishath | ............... | G06F 9/45558 |
| | | | | 709/221 |
| 2016/0231934 A1* | 8/2016 | Gensler, Jr. | ........... | G06F 3/0608 |
| 2017/0010809 A1* | 1/2017 | Hironaka | ............. | G06F 3/0665 |
| 2017/0038992 A1 | 2/2017 | Levy et al. | | |
| 2017/0344291 A1 | 11/2017 | Sterin et al. | | |
| 2018/0157517 A1* | 6/2018 | Dong | .................. | G06F 9/45558 |
| 2018/0181436 A1* | 6/2018 | Chen | ....................... | G06F 9/461 |

OTHER PUBLICATIONS

Carl, A., "Containers or Virtual Machines: How to Choose," TechGenix, Mar. 9, 2017, 10 pages, retrieved from http://techgenix.com/containers-or-virtual-machines/.

Evans, M., "Information technology—SCSI Block Commands—3 (SBC-3)," Working Draft Project American National Standard, Oct. 27, 2010, 274 pages, retrieved from http://www.13thmonkey.org/documentation/SCSI/sbc3r25.pdf.

Fatherlinux, "So, What Does a Container Engine Really Do Anyway?," Crunch Tools.com, Jul. 13, 2018, 5 pages, retrieved from http://crunchtools.com/so-what-does-a-container-engine-really-do-anyway/.

Mccarty, S., "A Practical Introduction to Container Terminology," Redhat, Feb. 22, 2018, 36 pages, retrieved from https://developers.redhat.com/blog/2018/02/22/container-terminology-practical-introduction/#h.6yt1ex5wfo3l.

* cited by examiner

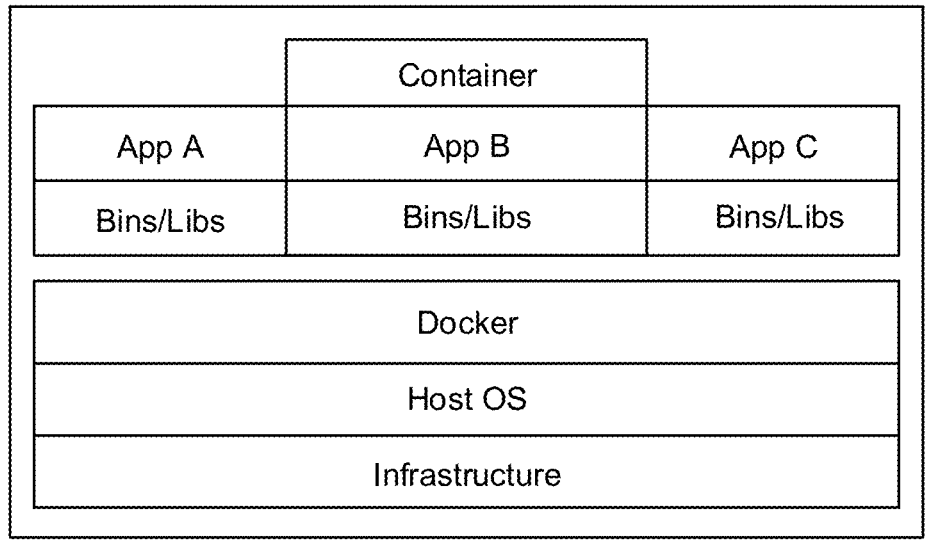
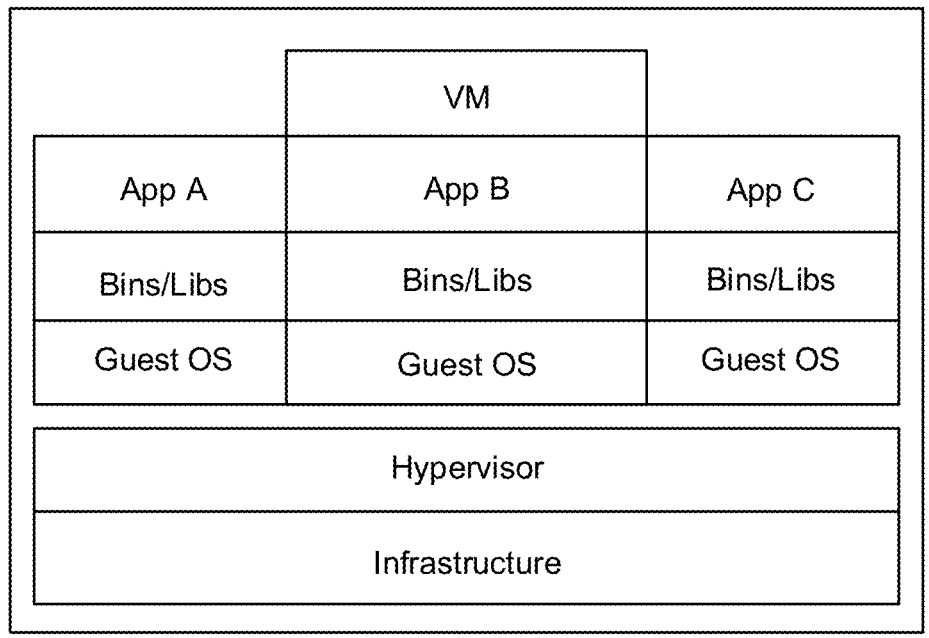
FIG. 4

| LBA 0 | LBA 1 | LBA 2 | LBA 3 | LBA 4 | LBA 5 | LBA 6 | LBA 7 |
|---|---|---|---|---|---|---|---|
| PB | PB | Unmapped | PB | Unmapped | Unmapped | PB | PB |

| LBA 0 | LBA 1 | LBA 2 | LBA 3 | LBA 4 | LBA 5 | LBA 6 | LBA 7 |
|---|---|---|---|---|---|---|---|
| PB | | Unmapped | | PB | | Unmapped | |

FIG. 5

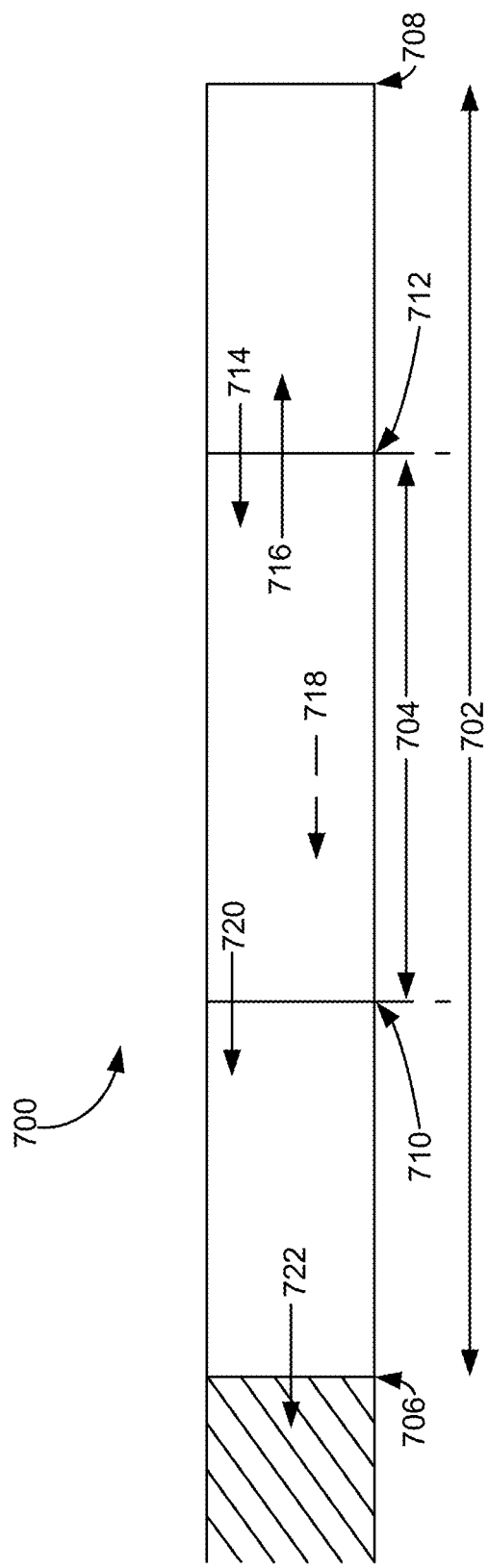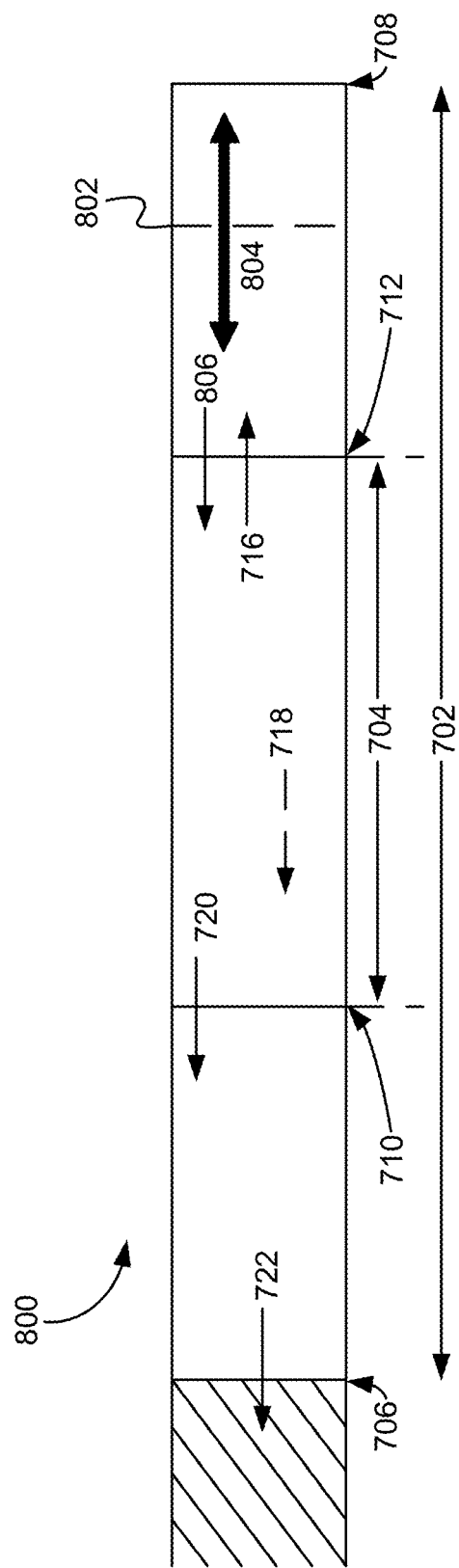

FAST PROVISIONING OF STORAGE BLOCKS IN THIN PROVISIONED VOLUMES FOR SUPPORTING LARGE NUMBERS OF SHORT-LIVED APPLICATIONS

BACKGROUND

The present invention relates to thin provisioning capable storage systems, and more specifically, this invention relates to near-instant provisioning of storage blocks in thin provisioned volumes to support short-lived applications.

In virtual storage, thick provisioning is a method of storage allocation where storage capacity is reallocated on physical storage at the time the storage medium is created. Thin provisioning provisions storage on an as-needed basis in order to avoid wasting physical capacity and/or to save on up-front storage costs. Thin provisioning delays allocation until it is necessary such that virtual machines recognize a fully allocated storage medium at all times. Virtual machines may consume only the capacity needed for the current files.

SUMMARY

A computer-implemented method, according to one embodiment, includes receiving a request for storage for a container and determining whether a suitable thin provisioned volume currently exists based on criteria in the request. In response to determining that a suitable thin provisioned volume currently exists, the method includes selecting an unused portion of the thin provisioned volume and creating a container volume in the selected unused portion of the thin provisioned volume. The method also includes permitting input/output (I/O) to the container volume and releasing the selected unused portion of the thin provisioned volume in response to determining the container volume is no longer needed.

A computer program product for fast provisioning of storage blocks in thin provisioned volumes, according to one embodiment, includes a computer readable storage medium having program instructions embodied therewith. The program instructions are executable by a computer. The program instructions cause the computer to perform the foregoing method.

A system, according to one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 illustrates exemplary containers and virtual machine stacks, according to one embodiment.

FIG. 5 illustrates exemplary relationships between logical block addressing (LBA) and physical blocks (PB), according to one embodiment.

FIG. 7 is an exemplary device subject to standard logical block provisioning with armed decreasing thresholds, according to one embodiment.

FIG. 8 is an exemplary device subject to instant logical block provisioning with armed decreasing thresholds, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for thin provisioning.

In one general embodiment, a computer-implemented method includes receiving a request for storage for a container and determining whether a suitable thin provisioned volume currently exists based on criteria in the request. In response to determining that a suitable thin provisioned volume currently exists, the method includes selecting an unused portion of the thin provisioned volume and creating a container volume in the selected unused portion of the thin provisioned volume. The method also includes permitting input/output (I/O) to the container volume and releasing the selected unused portion of the thin provisioned volume in response to determining the container volume is no longer needed.

In another general embodiment, a computer program product for fast provisioning of storage blocks in thin provisioned volumes includes a computer readable storage medium having program instructions embodied therewith. The program instructions are executable by a computer. The program instructions cause the computer to perform the foregoing method.

In another general embodiment, a system, according to one embodiment, includes a processor and logic integrated with the processor, executable by the processor, or integrated with and executable by the processor. The logic is configured to perform the foregoing method.

Figure 1:
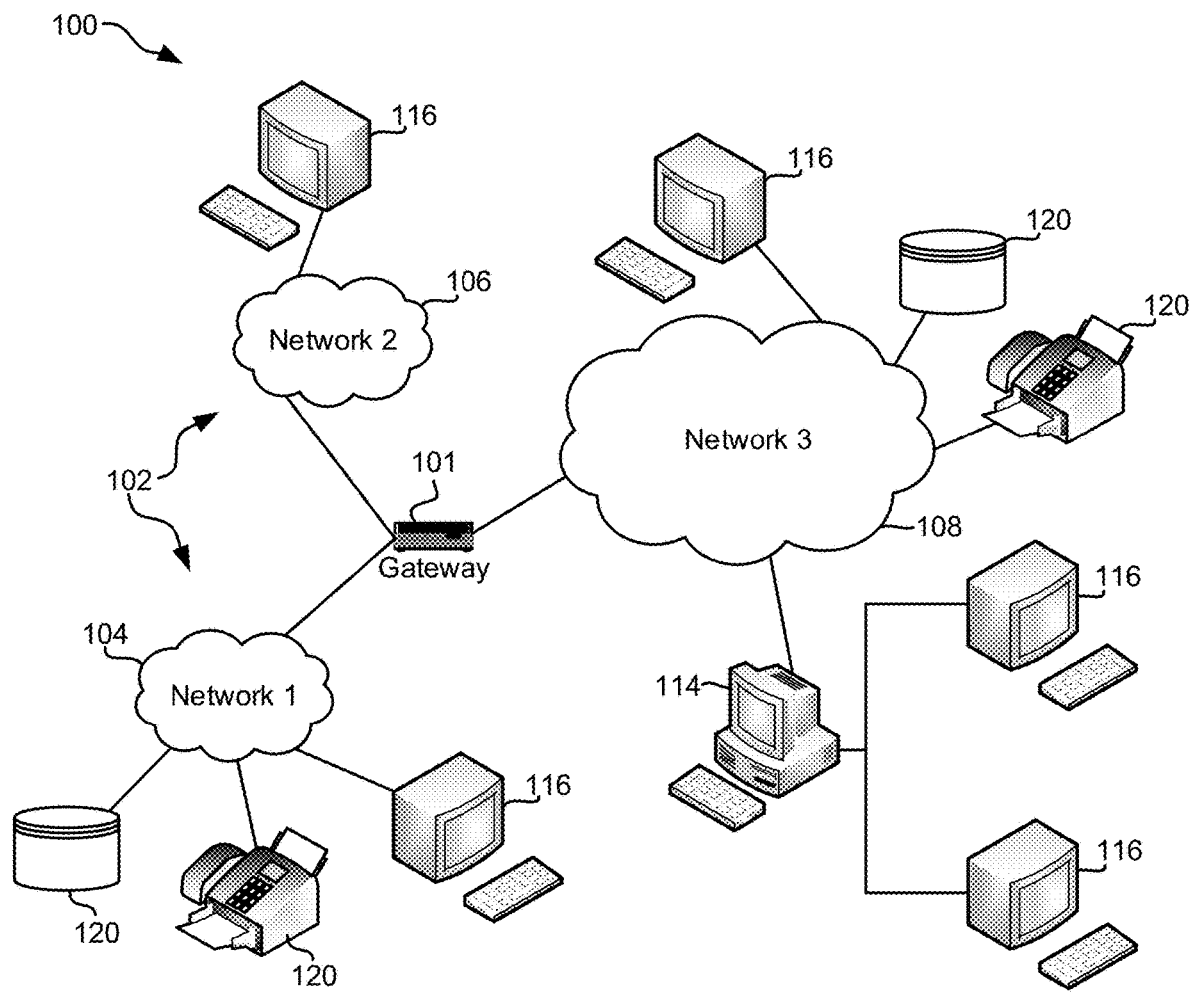
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
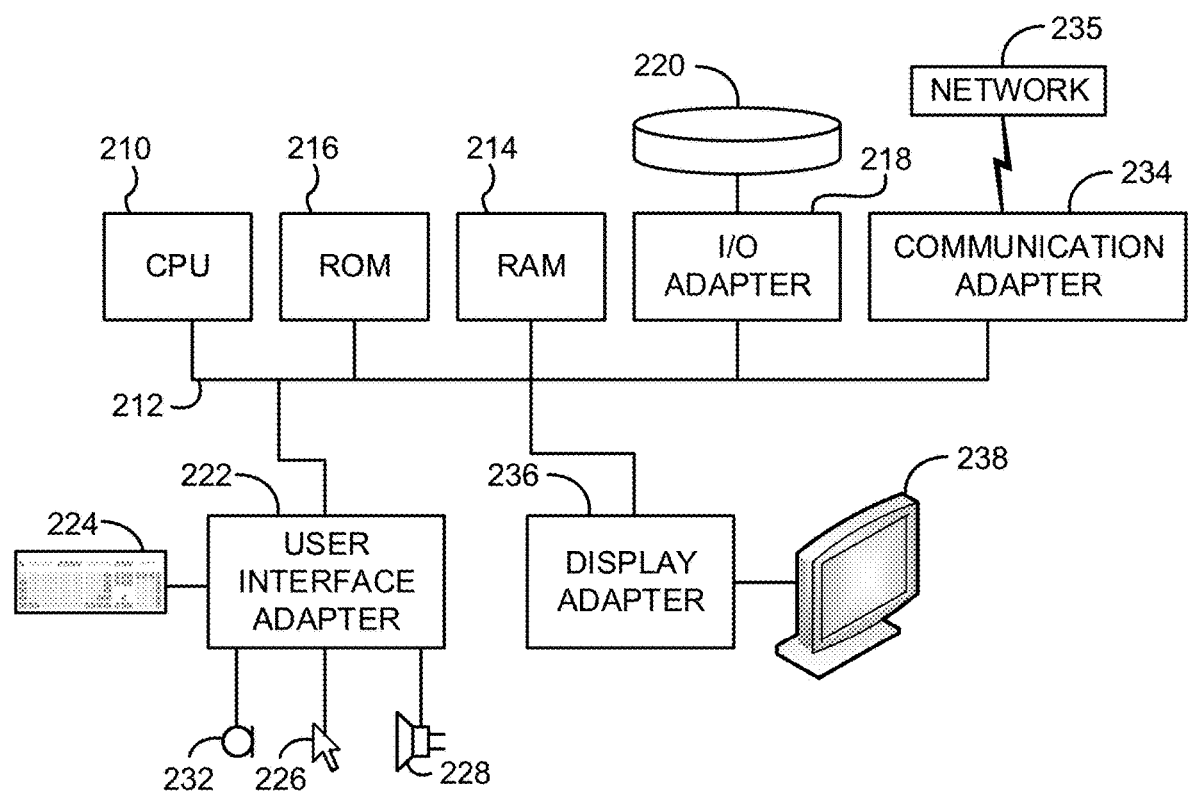
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
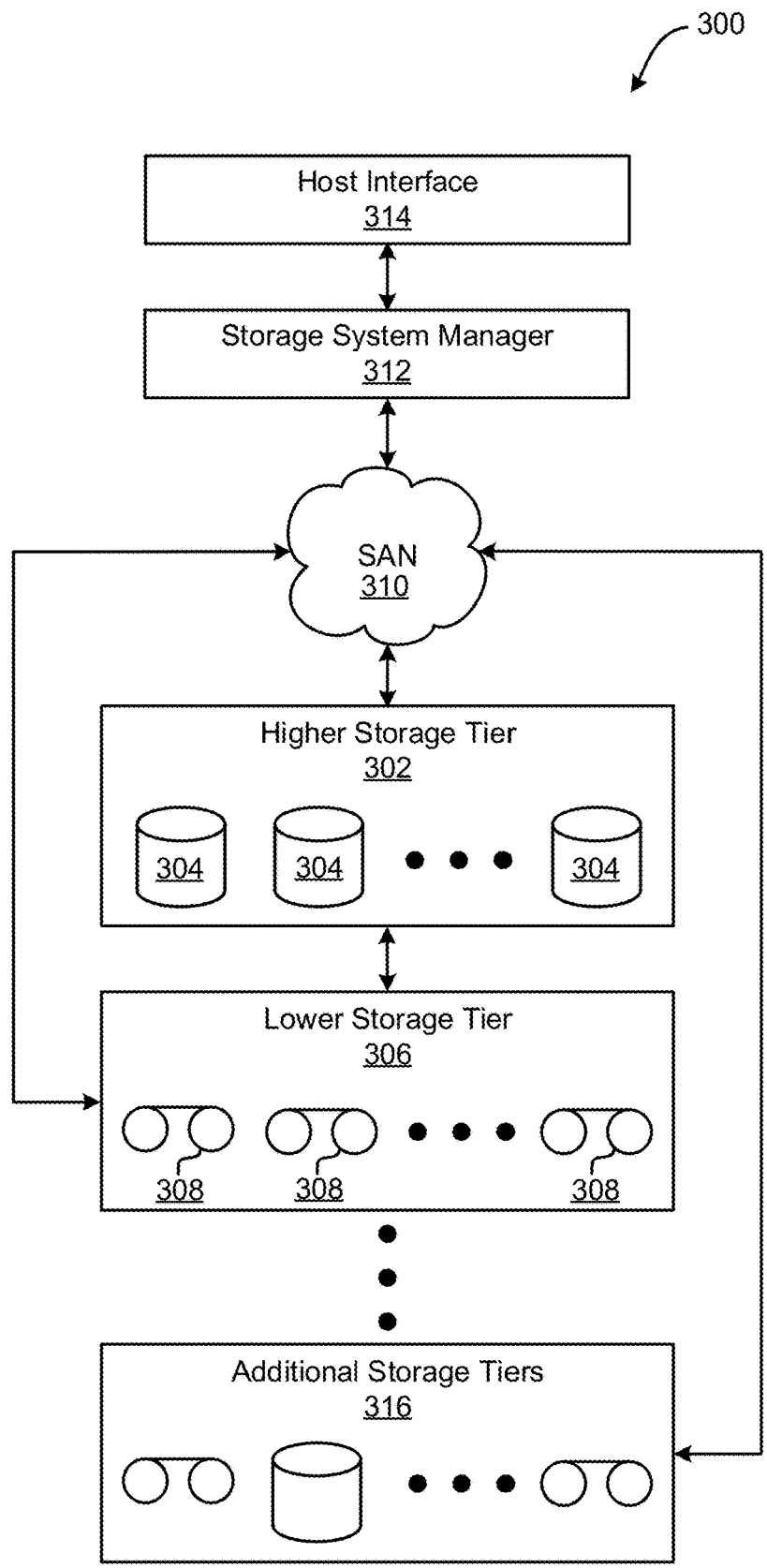
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Volumes are logical components which are created for a host to access storage on a storage array. Logical volumes may have many partitions and physical drives. Volumes may comprise a means for allocating and managing space on one or more mass storage devices. There is typically a layer of abstraction between the operating system and the physical devices which comprise the storage medium. The physical device structure may be independent of the volume as seen by the operating system.

Containers are logical constructs of space comprising one or more volumes. Volumes within a container share the space available in the container and may use any free space in the container to grow a volume. Containers are lightweight, standalone, executable software packages which may be portable irrespective of the operating system (OS) and/or kernel environments. Containers may be an abstraction of the application layer which packages code and/or dependencies together. Multiple containers may be running on the same machine where the containers share an OS. Each container may run an isolated process within the user space.

Virtual machines (VM) may be an abstraction of physical hardware which act as an operating system and/or application environment. A hypervisor may allow multiple virtual machines to run on a single machine with each virtual machine including a full copy of the OS, one or more apps, any necessary binaries and/or libraries, etc.

Containers and virtual machines have similar resource isolation and allocation benefits. Containers and virtual machines function differently where containers virtualize the OS instead of the hardware and containers are conventionally more portable and efficient.

FIG. 4 illustrates exemplary containers and virtual machine stacks.

Virtual volumes may be an integration and/or management framework for external storage that provide finer control of the virtual machine-level. Virtual volumes may streamline storage operation while offering flexibility.

Block storage controllers send various commands to the hypervisors of virtual machines which are communicated to the individual virtual machines. Commands may include create, delete, update, bind, unbind, rebind, etc. Similar commands may be sent directly to virtual volumes.

Storage arrays typically have some difficulties managing large numbers of volumes. Datastores may comprise VMs which are multiplexed onto smaller sets of physical storage entities (e.g. logical unit numbers (LUN)-based Virtual Machine File System (VMFS) clustered filed systems or file system (FS) volumes). These datastores have lower numbers of LUNs and/or FS volumes. Serial digital interface (SDI) technology prevents operation of storage policies which are applied to a LUN based on input from a VM. Virtual machines may not have 1:1 mapping between the VMs and the underlying storage. Virtual volumes may provide 1:1 mapping between the logical entity on the server side and the storage side. Access may be provided through gateway devices for scalability on the host and/or on the target side.

Storage arrays may receive requests from host software regarding management of virtual volumes. Requests may include create a LUN, provision a LUN, initiate an input/output (I/O) session, attach an I/O session to a gateway, attach an I/O session to a different gateway device, de-attach an I/O session from a gateway device, terminate an I/O session, delete a LUN, deprovision a LUN, etc. High numbers of requests are problematic for short-lived virtual volumes and/or containers. Creation requests are particularly problematic where creation cuts through all the layers and/or services in the storage array. Creation requests cause major delays. Storage arrays are not able to handle high demands for creation requests. High demand may comprise at least 100 instances. Parallel requests generally cause even more delays. Conventionally, the ratio of the time to process a creation command versus the time taken for the workload is greater than 1.

In typical map-reduce problem, once a mapper generates the output (which is fed to the reducer as input), input/output is stored in a storage medium. There may be hundreds of mapper instances which, although small, are often not saved in memory due to aggregating capacity. The storage space may come from existing TP volumes. Large numbers of mapper instances result in additional storage requirements even though the storage is temporary in nature.

Containers conventionally require high numbers of volumes to support them in a virtual volume architecture. The size of a data volume for a container may be too small when compared to data in traditional virtual machines. Applications which run on containers may not be heavy in nature and typically have very short lifecycles relative to traditional virtual machine applications. Short-lived applications may be suited for supporting real-time automated user application requests. Short-applications typically have high numbers of requests running in parallel. For example, short-lived applications may comprise microservices, internet of things (IoT)-based user processes, continuous integration processes, etc.

Temporary containers may store data output of map functions. These containers may be temporary and/or short-lived in nature. Various inventive embodiments disclosed herein provide operations for instant provisioning of a volume by thin provisioned capable storage arrays to support short-lived and/or temporary virtual volumes (e.g. container volumes (cVol)). Specifically, various embodiments provide relatively faster provisioning of new volumes out of existing TP physical block inventory and limit the effect of creation requests in the stack. Faster provisioning is possible because LBA mapping resources and/or physical block availability vary and are not tightly coupled with a TP volume. A host application may tolerate a small amount of delay at run time with an auto-grow feature because not all LBAs are physically mapped. A TP system conventionally has a hierarchical in-built mechanism to deal with future resource exhaustion. The resource exhaustion mechanism has three stages as discussed in further detail below. Various operations include provisioning temporary stores to host input data in the case of typical map-reduce problems. The storage system may inform a host if the storage system supports a container-friendly TP storage through a vendor specific inquiry page until the storage is accepted and/or assimilated into a Small Computer System Interface (SCSI) specification formally.

In one approach, non-used physical blocks of a TP volume and the three-stage resource exhaustion mechanism may be used to carve out instant physical space as required for containers and/or short-lived volumes. Various inventive embodiments provide relatively greater margins of safety for preventing unnecessary failure of the host application I/O session.

In preferred approaches, the inventive embodiments may be applied to short-lived applications including applications which use databases such a MongoDb, CouchBase, etc., software development applications with continuous integration processes, microservices running in the cloud for quick analytics, AI applications which build intelligent responses based on past data, etc. Short-lived applications may include any application which runs in a quick timeframe in a predefined environment.

FIG. 5 illustrates exemplary relationships between logical block addressing (LBA) and physical blocks. The relationships may be between the mapped and unmapped LBAs and physical blocks in a logical unit. Each LBA may be mapped to a physical block or an LBA may be unmapped. The initial state of each LBA may be deallocated for a TP volume.

In one approach, the logical block provisioning state of an LBA may change to unmapped (e.g. deallocated or unanchored) from mapped. The logical block provisioning state of an LBA may change to unmapped due to an UNMAP command, an UNMAP request, an autonomous LBA transition (e.g. following a FORMAT UNIT command and/or a write command that sets the logical block data to zero), a SANITIZE command, or any other command known in the art which initializes unmapped LBAs.

In another approach, the logical provisioning state of an LBA may change to mapped from unmapped. The logical block provisioning state of an LBA may change to mapped due to a write operation to the LBA, an autonomous LBA transition, or any other command known in the art which initializes mapped LBAs.

A storage controller may keep an inventory to track all mapped and/or unmapped LBAs. Each TP volume may have a counter (e.g. real size) which may be tracked by the storage controller internally. The real size may be equivalent to the physical blocks and/or the logical block mapping resources which are available. The physical blocks and/or the logical block mapping resources may be tracked. Not all physical blocks may be used in stage 2 of the resource exhaustion mechanism (to be discussed in further detail below).

In one embodiment, a resource exhaustion mechanism may involve three stages. The first stage may comprise notifying application clients using a unit attention message (e.g., sense data, "THIN PROVISIONING SOFT THRESHOLD REACHED," etc.) when thresholds associated with the logical block mapping resources are breached.

The second stage may comprise termination, by the storage device, when a command causes a temporary resource exhaustion condition. The command may be a write command. The storage device may terminate the command by using sense data. The second stage may include returning a "LOGICAL UNIT NOT READY, SPACE ALLOCATION IN PROGRESS" message or any similar message to notify an application client of the temporary resource exhaustion condition. In response to receiving such a message, the application client may resend the command.

For example, a server may retry the original request four times with the retry interval set to one second before failing back to the application. A storage array may have a few seconds to move the LBA from a mapped state to make physical blocks and/or logical block mapping resources available.

A third stage may comprise preventing the thin provisioned logical unit from performing the write operation in response to persistent lack of LBA mapping resources. In one approach, the storage device may terminate the command requesting the write operation with a "CHECK CONDITION" status with a sense key set to "DATA PROTECT." An additional sense code may be set to "SPACE ALLOCATION FAILED WRITE PROTECT." A host may send a failure status to the application. The LUN may be offline until manual intervention is taken by an administrator.

Figure 6:
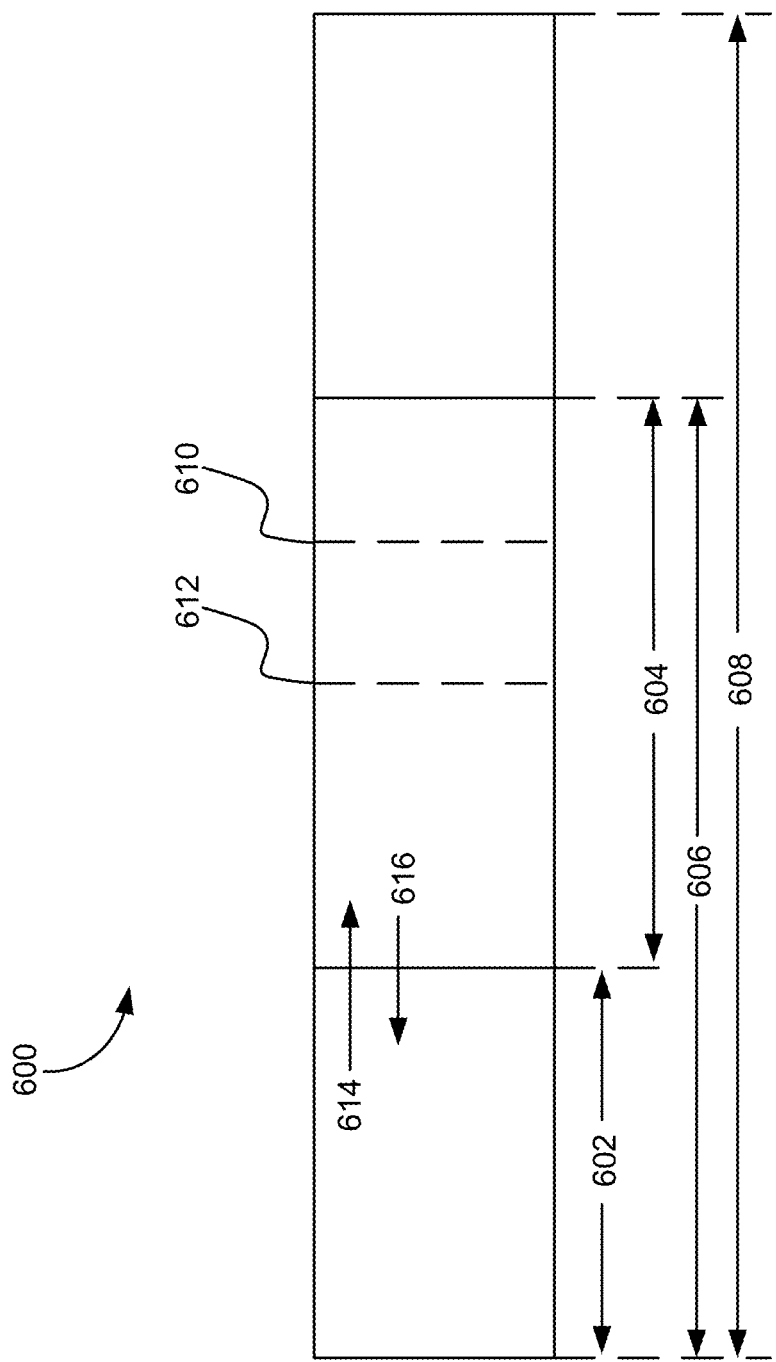
FIG. 6 is an exemplary resource chart of a thin provisioned (TP) volume with physical blocks and LBA, according to one embodiment.

FIG. 6 is an exemplary resource chart of a thin provisioned (TP) volume 600 with physical blocks and LBA, according to one embodiment. As an option, the present TP volume 600 may be implemented in conjunction with features from any other embodiment listed herein, such as those described with reference to the other FIGS. Of course, however, such TP volume 600 and others presented herein may be used in various applications and/or in permutations which may or may not be specifically described in the illustrative embodiments listed herein. Further, the TP volume 600 presented herein may be used in any desired environment.

The TP volume 600 may comprise physical resources (e.g. physical blocks) which are mapped (e.g. consumed) 602 and physical blocks which are unmapped (e.g. unused) 604. Consumed physical resources and unconsumed physical resources comprise the real size 606 of the TP volume (e.g. physical blocks which are committed). The real size 606 may be less than or equal to the advertised size 608 of the TP volume as advertised to the host.

In some approaches, the TP volume 600 may comprise a threshold value (A) 610 which may trigger a notification. In a preferred approach, the TP volume 600 may comprise a container volume (cVol) threshold value (A') 612. The cVol threshold value (A') 612 may be active when a cVol is carved out of the TP volume as discussed in further detail below.

In one approach, the TP volume 600 may receive a consumption request 614 to modify the consumed resources 602. In another approach, the TP volume 600 may receive an unmapped request 616 to modify the consumed resources 602. Each request may adjust the size of the consumed resources 602 accordingly.

Logical block provisioning thresholds may provide a mechanism for establishing a unit attention condition in order to notify application clients when various thresholds related to logical block provisioning are breached. Logical block provisioning thresholds may be for armed increasing or armed decreasing.

FIG. 7 is an exemplary device 700 subject to standard logical block provisioning with armed decreasing thresholds, according to one embodiment. As an option, the present device 700 may be implemented in conjunction with features from any other embodiment listed herein, such as those described with reference to the other FIGS. Of course, however, such device 700 and others presented herein may be used in various applications and/or in permutations which may or may not be specifically described in the illustrative embodiments listed herein. Further, the device 700 presented herein may be used in any desired environment.

The exemplary device 700 comprises the entire range of values over which an armed decreasing threshold may be applied 702. In some approaches, the threshold range 704 may be less than or equal to the entire range 702 of values over which an armed decreasing threshold may be applied. In one approach, for an available resource, the lowest value 706 may represent zero available LBA mapping resources. The highest value 708 may represent the maximum possible number of available LBA mapping resources.

In some approaches, the threshold minimum 710 may be the lowest number of LBAs in the threshold range 704. In other approaches, the threshold maximum 712 is the highest number of LBAs in the threshold range 704. A threshold count may be the center of the threshold range 704 for the threshold. A threshold set size may be the number of LBAs in each threshold set.

In one approach, if reporting of armed decreasing threshold events is enabled, the device 700 which is subject to standard logical block provisioning armed decreasing thresholds responds to the various operations within the device 700 accordingly.

Operation 714 may comprise applying the threshold to a value below the threshold maximum 712 for the threshold range 704. In response applying the threshold to a value below the threshold maximum 712 for the threshold range 704, a notification trigger may be enabled.

Operation 716 may comprise applying the threshold to a value above the threshold maximum 712 for the threshold range 704. In response to applying the threshold to a value above the threshold maximum 712 for the threshold range 704, a notification trigger may be disabled.

Operation 718 may comprise disabling the notification trigger and performing a logical block provisioning threshold notification in response to enabling the notification trigger.

Operation 720 may comprise applying the threshold to a value below the threshold minimum 710 for the threshold range 704. In response to enabling a notification trigger, operation 720 may comprise disabling the notification trigger and performing a logical block provisioning threshold notification in response to enabling the notification.

In some approaches, operation 722 may comprise applying the threshold to the lowest value 706 resulting in temporary resource exhaustion (e.g. stage 2 of the resource exhaustion mechanism as described above).

FIG. 8 is an exemplary device 800 subject to instant logical block provisioning with armed decreasing thresholds, according to one embodiment. As an option, the present device 800 may be implemented in conjunction with features from any other embodiment listed herein, such as those described with reference to the other FIGS. Of course, however, such device 800 and others presented herein may be used in various applications and/or in permutations which may or may not be specifically described in the illustrative embodiments listed herein. Further, the device 800 presented herein may be used in any desired environment.

The exemplary device 800 may comprise a cVol threshold (a') 802. The cVol threshold (a') 802 may be greater than the threshold maximum 712. The cVol threshold (a') 802 may be between the threshold maximum 712 and the highest value 708. For example, the following formula denotes the relationship between the cVol threshold (a') 802, the threshold maximum 712 and the highest value 708.

$$\text{threshold maximum} < \text{cVol threshold } (a') < \text{highest value}$$

In some approaches, the cVol threshold (a') 802 may be determined by considering the average storage consumption rate, the cVol size, current LBA mapping resource and/or physical block availability, the difference between the foregoing availability and the threshold maximum 712, etc.

Device 800 which is subject to instant logical block provisioning armed decreasing thresholds with cVol threshold (a') 802 responds to the various operations within the device 800 accordingly.

Operation 804 may comprise applying the threshold to a value hovering above the cVol threshold (a') 802. A new cVol may be carved out from the volume as discussed in further detail below in reference to FIG. 11. The physical blocks and/or logical block mapping resources which are unmapped to any LBA may be used for creating the new cVol. In one approach, the usage of the physical blocks may not be counted toward the parent TP volume and is counted against the new volume (e.g. the new cVol). In some approaches, operation 804 appears as transparent to the host and appears as a standard creation of a new volume.

Alternatively, if the threshold is applied to a value which drops below the cVol threshold (a') 802, physical blocks may be provisioned equal to the size of the cVol. The provisioned physical blocks may be made available to the parent TP volume. In a preferred approach, provisioning the physical blocks may be completed before the value drops below the threshold maximum 712. In response to the value dropping below the threshold maximum 712, the provisioning may continue as long as the threshold minimum 710 is not breached.

Operation 806 may comprise applying the threshold to a value below the threshold maximum 712 for the threshold range 704. In response to applying the threshold to a value below the threshold maximum 712 for the threshold range 704, a notification trigger may be enabled unless creation and/or cloning of a new volume is in progress. In one approach, the notification enablement may be deferred until the threshold minimum 710 is breached.

Operation 716 may comprise applying the threshold to a value above the threshold maximum 712 for the threshold range 704. In response to applying the threshold to a value above the threshold maximum 712 for the threshold range 704, a notification trigger may be disabled.

Operation 718 may comprise disabling the notification trigger and performing a logical block provisioning threshold notification in response to enabling the notification trigger.

Operation 720 may comprise applying the threshold to a value below the threshold minimum 710 for the threshold range 704. In response to enabling a notification trigger, operation 720 may comprise disabling the notification trigger and performing a logical block provisioning threshold notification in response to enabling the notification.

In some approaches, operation 722 may comprise applying the threshold to the lowest value 706 resulting in temporary resource exhaustion (e.g. stage 2 of the resource exhaustion mechanism as described above).

In one approach, creating a new thick volume to hold the cVol data may occur immediately in response to ending the container life. The threshold maximum 712 may not be breached. LBA mapping resources may be used for the new cVol and/or for the parent TP volume. The storage device may maintain a candidate list of TP volumes for housing the cVol based on the above criteria with armed decreasing thresholds.

Figure 9:
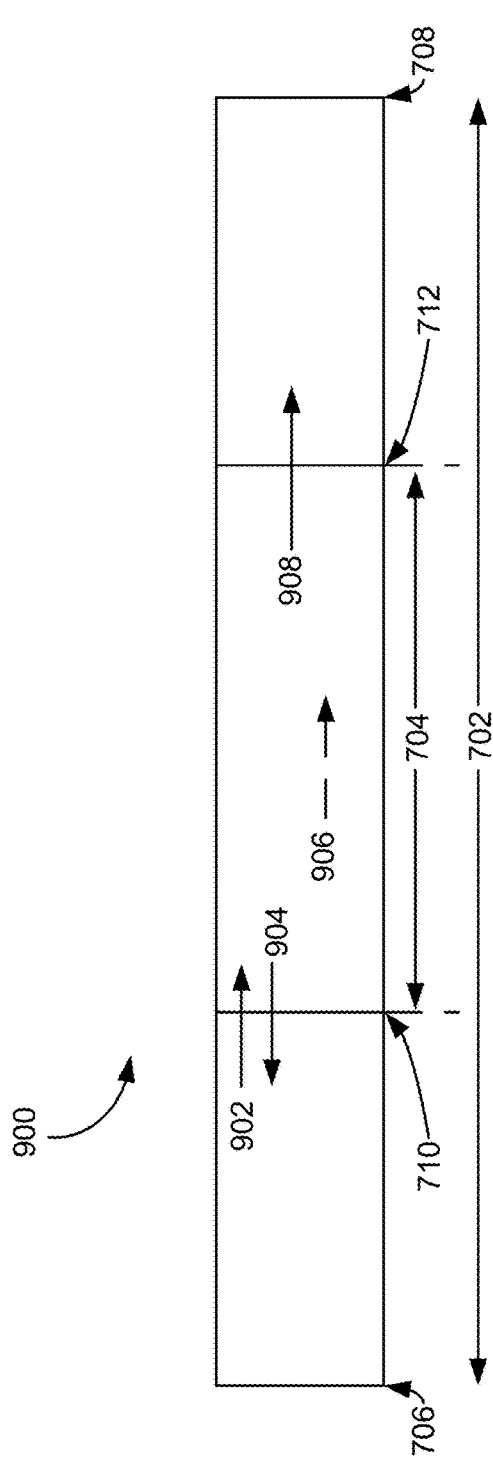
FIG. 9 is an exemplary device subject to standard logical block provisioning with armed increasing thresholds, according to one embodiment.

FIG. 9 is an exemplary device 900 subject to standard logical block provisioning with armed increasing thresholds, according to one embodiment. As an option, the present device 900 may be implemented in conjunction with features from any other embodiment listed herein, such as those described with reference to the other FIGS. Of course, however, such device 900 and others presented herein may be used in various applications and/or in permutations which may or may not be specifically described in the illustrative embodiments listed herein. Further, the device 900 presented herein may be used in any desired environment.

In one approach, if reporting of armed increasing threshold events is enabled, the device 900 which is subject to standard logical block provisioning armed increasing thresholds responds to the various operations within the device 900 accordingly.

Operation 902 may comprise applying the threshold to a value above the threshold minimum 710 for the threshold range 704. In response to applying the threshold to value above the threshold minimum 710 for the threshold range 704, a notification trigger may be enabled.

Operation 904 may comprise applying the threshold to a value below the threshold minimum 710 for the threshold range 704. In response to applying the threshold to a value below the threshold minimum 710 for the threshold range 704, the notification trigger may be disabled.

Operation 906 may comprise disabling the notification trigger and performing a logical block provisioning threshold notification in response to enabling the notification trigger.

Operation 908 may comprise applying the threshold to a value above the threshold maximum 712 for the threshold range 704. In response to enabling a notification trigger, operation 908 may comprise disabling the notification trigger and performing a logical block provisioning threshold notification in response to enabling the notification.

Figure 10:
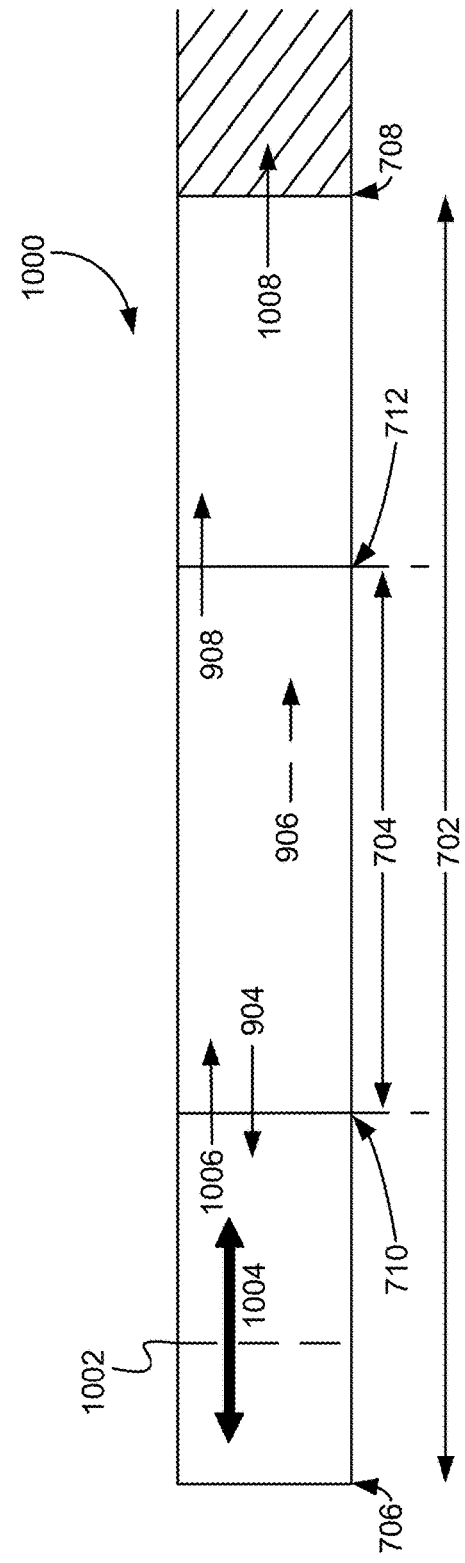
FIG. 10 is an exemplary device subject to instant logical block provisioning with armed increasing thresholds, according to one embodiment.

FIG. 10 is an exemplary device 1000 subject to instant logical block provisioning with armed increasing thresholds, according to one embodiment. As an option, the present device 1000 may be implemented in conjunction with features from any other embodiment listed herein, such as those described with reference to the other FIGS. Of course, however, such device 1000 and others presented herein may be used in various applications and/or in permutations which may or may not be specifically described in the illustrative embodiments listed herein. Further, the device 1000 presented herein may be used in any desired environment.

The exemplary device 1000 may comprise an additional cVol threshold (a') 802. The cVol threshold (a') 1002 may be greater than the threshold minimum 710. The cVol threshold (a') 1002 may be between the threshold minimum 710 and the lowest value 706. For example, the following formula denotes the relationship between the cVol threshold (a') 1002, the threshold minimum 710 and the lowest value 706.

$$\text{lowest value} < \text{cVol threshold } (a') < \text{threshold minimum}$$

In some approaches, the cVol threshold (a') 1002 may be determined by considering the average storage consumption rate, the cVol size, current LBA mapping resource and/or physical block availability, the difference between the foregoing availability and the threshold minimum 710, etc.

Device 1000 which is subject to instant logical block provisioning armed increasing thresholds with cVol threshold (a') 1002 responds to the various operations within the device 1000 accordingly.

Operation 1004 may comprise applying the threshold to a value hovering below the cVol threshold (a') 1002. In one approach, a new cVol may be carved out from the volume as discussed in further detail below in reference to FIG. 11. The physical blocks and/or logical block mapping resources which are unmapped to any LBA may be used for creating the new cVol. In one approach, the usage of the physical blocks may not be counted toward the parent TP volume and is counted against the new volume (e.g. the new cVol). In some approaches, operation 1004 appears as the transparent to the host and as a standard creation of a new volume.

Alternatively, if the threshold is applied to a value which increases above the cVol threshold (a') 1002, physical blocks are provisioned equal to the size of the cVol. The provisioned physical blocks may be made available to the parent TP volume. In a preferred approach, provisioning the physical blocks may be completed before the value increases above the threshold minimum 710. In response to the value increasing above the threshold minimum 710, the provisioning may continue as long as the threshold maximum 712 is not breached.

Operation 1006 may comprise applying the threshold to a value above the threshold minimum 710 for the threshold range 704. In response to applying the threshold to a value above the threshold minimum 710 for the threshold range 704, a notification trigger may be enabled unless creation and/or cloning of a new volume is in progress. In one approach, the notification enablement may be deferred until the threshold maximum 712 is breached.

Operation 904 may comprise applying the threshold to a value below the threshold minimum 710 for the threshold range 704. In response to applying the threshold to a value below the threshold minimum 710 for the threshold range 704, the notification trigger may be disabled.

Operation 906 may comprise disabling the notification trigger and performing a logical block provisioning threshold notification in response to enabling the notification trigger.

Operation 908 may comprise applying the threshold to a value above the threshold maximum 712 for the threshold range 704. In response to enabling a notification trigger, operation 908 may comprise disabling the notification trigger and performing a logical block provisioning threshold notification in response to enabling the notification.

In some approaches, operation 1008 may comprise applying the threshold to the highest value 708 resulting in temporary resource exhaustion (e.g., stage 2 of the resource exhaustion mechanism as described above).

In one approach, creating a new thick volume to hold the cVol data may occur immediately in response to ending the container life. The threshold minimum 710 may not be breached. LBA mapping resources may be used for the new cVol and/or for the parent TP volume. The storage device may maintain a candidate list of TP volumes for housing the cVol based on the above criteria with armed increasing thresholds.

Figure 11:
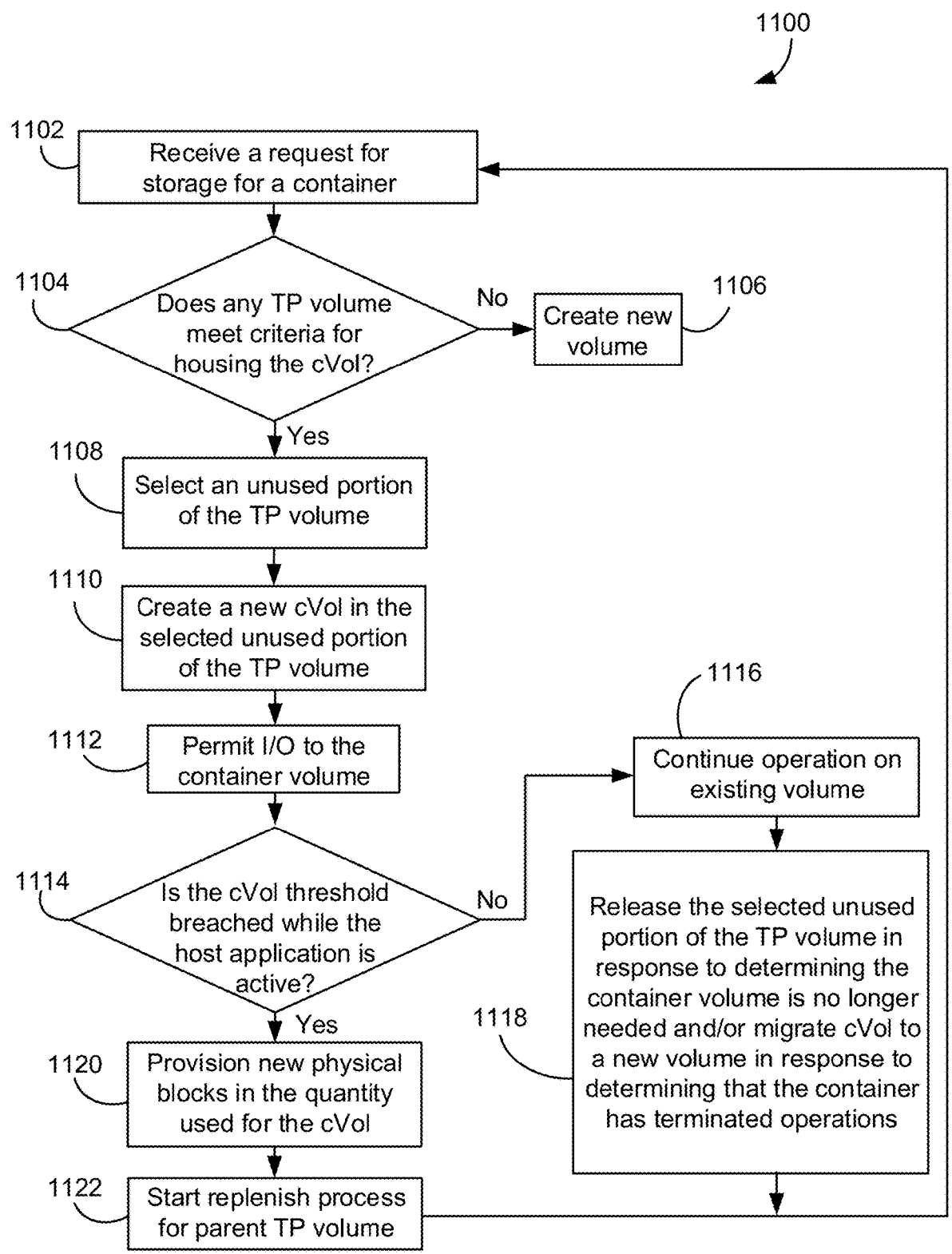
FIG. 11 is a flowchart of a method, according to one embodiment.

Now referring to FIG. 11, a flowchart of a method 1100 is shown according to one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may include operation 1102 comprising receiving a request for storage for a container. In one approach, a container engine (CE) and/or host application may send a create container request to a protocol endpoint (PE) on a storage controller. The create container request may be sent via a Storage for Container (SFC) interface.

In some approaches, the container engine may comprise backend storage for storing modified container images of the data volume. The storage controller may provide storage to the container engine. The storage controller may be capable of catering to multiple short-lived create requests for the container image volumes and/or the data volume. An SFC interface may enhance communication between the storage controller and the container engine. In one approach, the SFC may forward requests received from the container engine to the storage controller. The SFC may deliver the response to the container engine from the storage controller.

In one approach, the container engine is registered on the SFC interface and shares authority to create containers. The storage controller may be registered on the SFC interface and shares authority to perform administrative tasks regarding containers including creating containers, deleting containers, managing containers, etc. The SFC interface may have a direct connection to both the container engine and the storage controller for controlling commands between the container engine and the storage controller.

Decision block 1104 includes an operation for determining whether a suitable thin provisioned volume currently exists based on criteria in the request. An already existing TP volume (e.g. a parent TP volume) may meet criteria for housing a cVol. Criteria for housing a cVol may include an average storage consumption rate, the cVol size, current LBA mapping resources and/or physical blocks, the difference between a threshold minimum and the lowest value, the difference between a threshold maximum and the highest value, etc. The cVol properties may be based on the create container request and various parameters included in the request.

Decision block 1104 may include an operation for determining that a thin provisioned volume is suitable based on determining that an amount of available resources in the thin provisioned volume exceeds a cVol threshold (a'). For example, for armed decreasing thresholds, the number of available LBAs in a suitable thin provisioned volume exceeds the cVol threshold (a'). See FIG. 8. In armed increasing threshold, the amount of used resources in a suitable thin provisioned volume is below the cVol threshold (a'). See FIG. 10.

If yes, operation 1108 includes, in response to determining that a suitable thin provisioned volume currently exists, selecting an unused portion of the thin provisioned volume. In one approach, selecting an unused portion of the thin provisioned volume includes identifying and selecting any unused (e.g., unmapped) physical blocks. The unused physical blocks may be allocated for the cVol.

If no, operation 1106 includes, in response to determining that no suitable thin provisioned volume currently exists, creating a new volume for storing the container. Creating a new volume for the container may comprise any conventional provisioning techniques known in the art.

Operation 1110 includes creating a container volume (cVol) in the selected unused portion of the thin provisioned volume. In one approach, the storage controller creates a smaller cVol within an existing TP volume (e.g., the parent volume) which is suited to house a cVol.

In one approach, after creating the container volume in the thin provisioned volume, operation 1110 may include sending a threshold breach notification when the amount of available resources in the thin provisioned volume crosses a first threshold of the thin provisioned volume. For example, a threshold breach notification may be sent if an amount of available resources falls below a threshold maximum in an armed decreasing threshold. See FIG. 8 (806). A threshold breach notification may be sent if an amount of available resources rises above a threshold minimum in an armed increasing threshold. See FIG. 10 (1006).

In one approach, operation 1110 may include sending a temporary resource exhaustion notification when the amount of available resources in the thin provisioned volume crosses a second threshold of the thin provisioned volume. For example, a temporary resource exhaustion notification may be sent if an amount of available resources falls below a threshold minimum in an armed decreasing threshold. See FIGS. 8 (720 and 722). A temporary resource exhaustion notification may be sent if an amount of available resources rises above a threshold maximum in an armed increasing threshold. See FIGS. 10 (908 and 1008).

In one approach, the storage controller may carve out a new LUN from an existing TP volume which comprises unconsumed physical blocks and/or LBA mapping resources. The storage controller may determine that carving out the LUN from the existing TP volume will not create a deficiency and/or application failure hosted on the original volume.

Unconsumed physical blocks may be managed such that no extra delay is required for the layers/services of the storage array. For example, the unconsumed physical blocks have previously undergone operations including the initialization, cache, encryption, mapping to underlying physical storage, etc. The provisioning of the unconsumed physical blocks may be relatively faster than provisioning new physical blocks.

In one approach, operation 1110 may include returning a cVol ID to the CE and/or host application. A secondary level LUN identifier may be returned to the CE and/or host application.

In one approach, operation 1110 may include sending, by the CE and/or host application, a BIND request to the PE. The storage controller may receive the BIND request. The BIND request may lock the cVol for the host application such that no other application may use the cVol.

Operation 1112 includes permitting input/output (I/O) to the container volume. During the I/O session, the host application may send data to the cVol. Decision block 1114 may include an operation for determining whether the cVol threshold is breached while the host application is active.

If yes, operation 1120 includes provisioning new physical blocks in an amount equal to the size of the cVol. Operation 1120 may include provisioning additional physical blocks to the thin provisioned volume in response to determining that the usage thereof has exceeded a threshold.

If no, operation 1116 includes continuing operation on the existing volume.

In one approach, the I/O session remains active for the lifetime of the container unless a rebind request is honored to create a new I/O session in place of the existing I/O session.

Operation 1122 may include replenishing the parent TP volume. If the cVol threshold breaches before the container ends, operation 1122 may include replenishing the parent TP volume by provisioning physical blocks which may host the LBAs for the cVol. In one approach, new physical blocks may be made available to the parent TP volume. In a preferred approach, the replenishing is completed before a temporary resource exhaustion mechanism occurs.

Operation 1118 includes releasing the selected unused portion of the thin provisioned volume in response to determining the container volume is no longer needed. Releasing the selected unused portion of the thin provisioned volume may include returning the original LBAs of cVol to the parent TP volume inventory. In one approach, the physical blocks may be returned to the parent TP volume. The cVol may exist independently from the parent TP volume. In another approach, operation 1118 may include releasing the host application.

Operation 1118 may include determining the container volume is no longer needed where the cVol has been migrated to a new volume. In one approach, the new volume replaces the cVol by taking over a uniquely universe identifier (UUID). Migrating the container volume to a new volume may be in response to determining that the container has terminated operations. In one approach, the migrated container volume may be available to another container. Another container may be for a different instance of the same container, another container, etc.

In one approach, operation 1118 may include determining the container volume is no longer needed where the lifetime of the container has ended. Operation 1118 may include creating a new volume in response to completing operation on the existing volume. In one approach, the cVol may unbind from the PE and create and/or clone a new volume.

In one approach, method 1100 may include receiving a rebind request, and in response thereto, creating a new input/output session to the container volume. The rebind request may be for a different instance of the same container, for another container, etc.

Various operations of the foregoing method may be reiterated for each request to the parent TP volume if a suitable parent TP volume currently exists based on the criteria for housing the cVol in the request.

Figure 12:
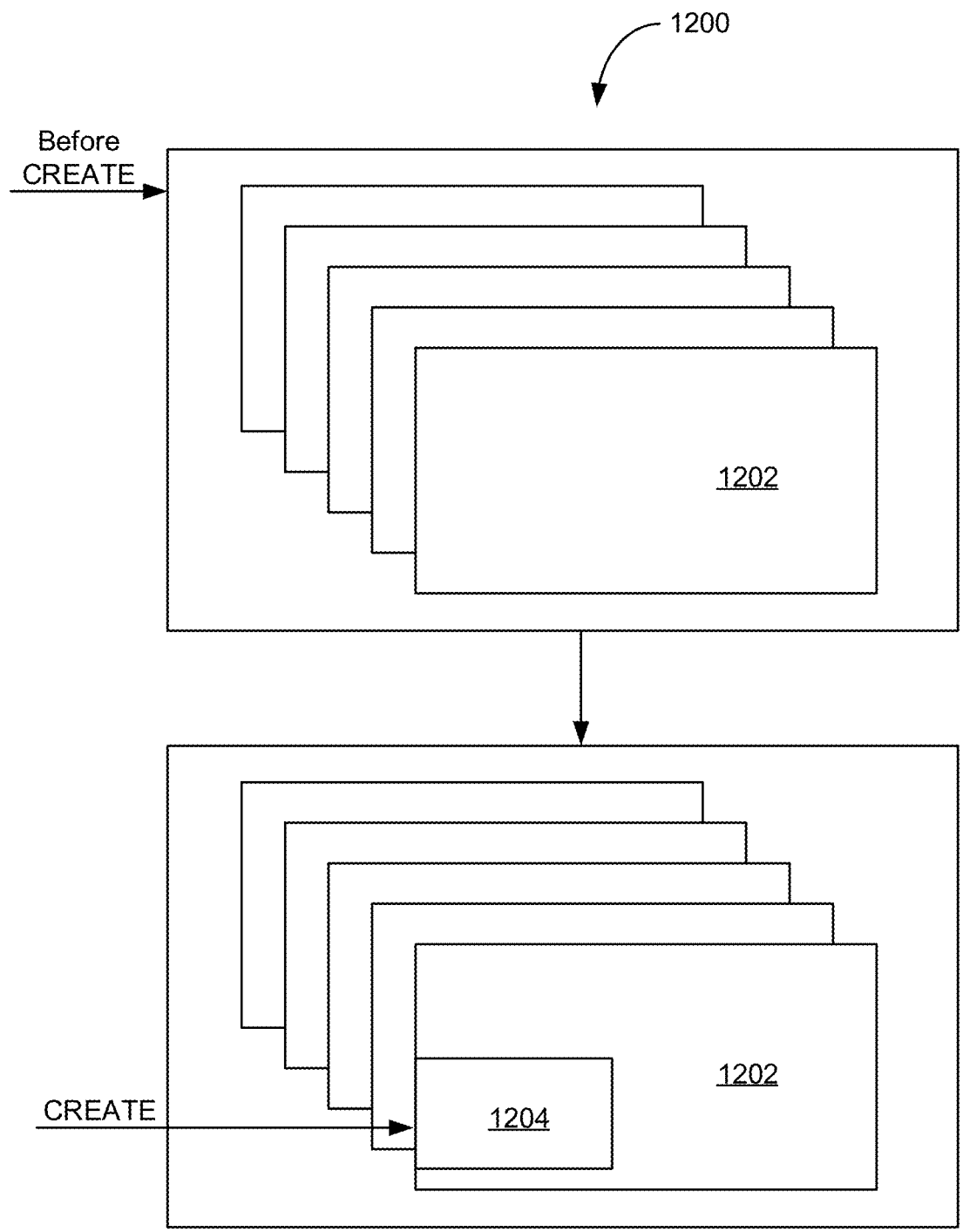
FIG. 12 is an exemplary storage controller, according to one embodiment.

FIG. 12 is an exemplary storage controller 1200 before and after receiving a create request for storage for a container. Storage controller 1200 may comprise a plurality of already existing thin provisioned volumes 1202. The storage controller 1200 may receive a create request for storage for a container. The storage controller 1200 may select an unused portion of an existing suitable thin provisioned volume and create a container volume (cVol) 1204 according to various embodiments of method 1100.

Figure 13:
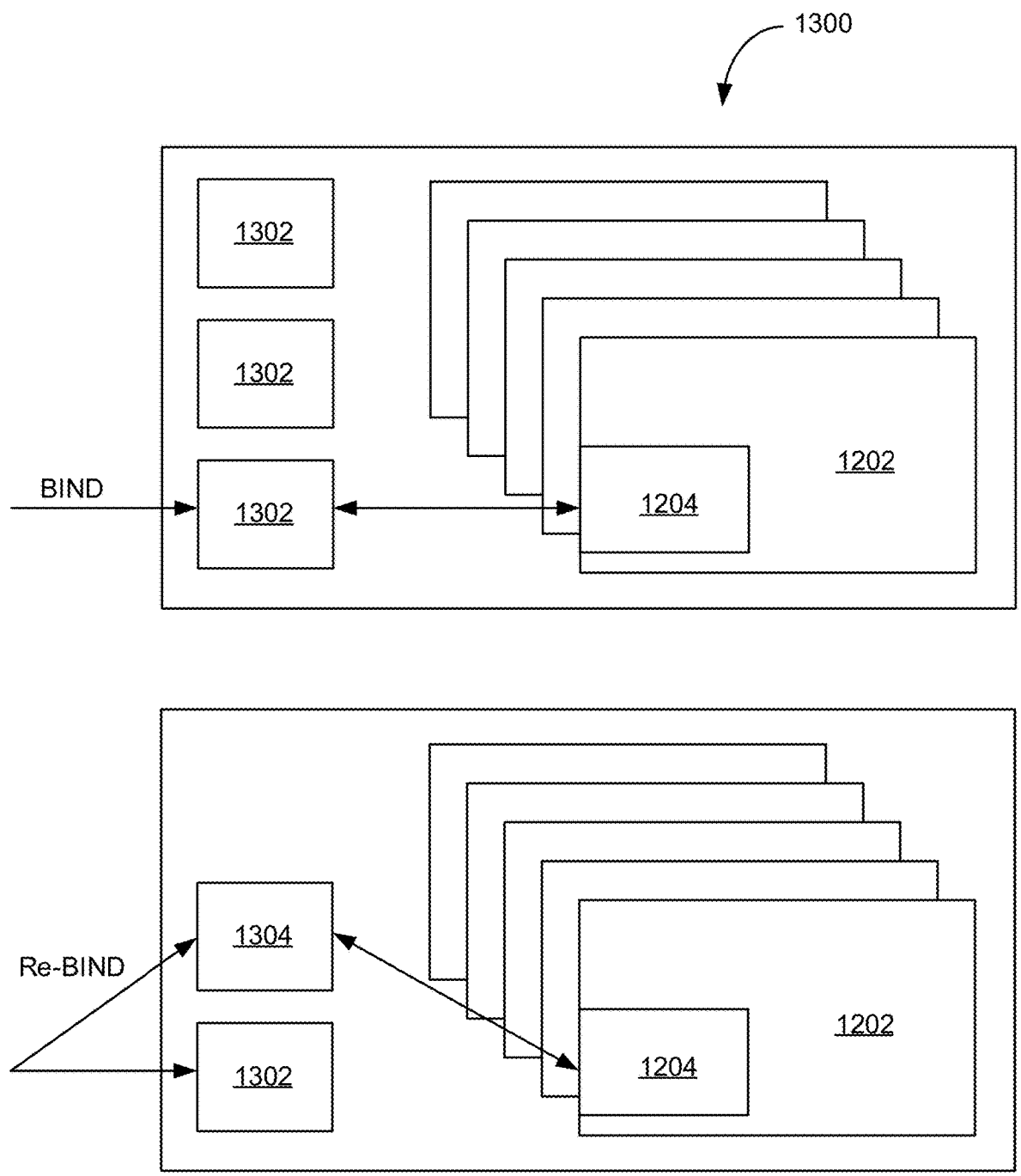
FIG. 13 is an exemplary storage controller, according to one embodiment.

FIG. 13 is an exemplary storage controller 1300 comprising thin provisioned volumes 1202 and a container volume (cVol) 1204. In one approach, the storage controller 1300 may receive a BIND request to a protocol endpoint 1302. The BIND request may lock the cVol for the host application such that no other application may use the cVol. A secondary level LUN identifier may be returned to the CE and/or host application. The storage controller may receive a rebind request and, in response thereto, create a new I/O session to the container volume. The rebind request may be for a different instance of the same container, for another container, etc. A second PE 1304 may be selected for the new I/O session.

Figure 14:
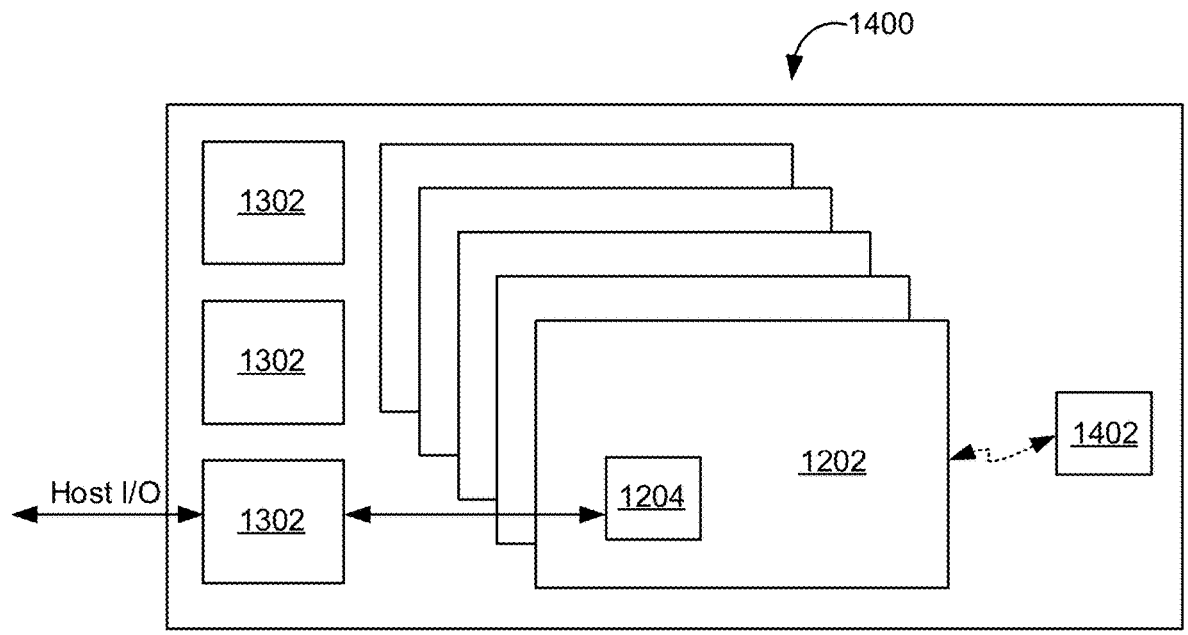
FIG. 14 is an exemplary storage controller, according to one embodiment.

FIG. 14 is an exemplary storage controller 1400 comprising thin provisioned volumes 1202 and a container volume (cVol) 1204. The storage controller 1400 may provision additional physical blocks 1402 in response to determining that a usage thereof has exceeded a threshold according to various approaches of operation 1120 of method 1100. In one approach, the threshold may be breached before the container application is terminated. New physical blocks 1402 may be provisioned to the parent TP volume 1202. The number of new physical blocks 1402 equal to the size of the cVol 1204 which was previously carved out of the parent TP volume 1202. In some approaches, the cVol 1204 may attain individual identity within the parent TP volume 1202.

Figure 15:
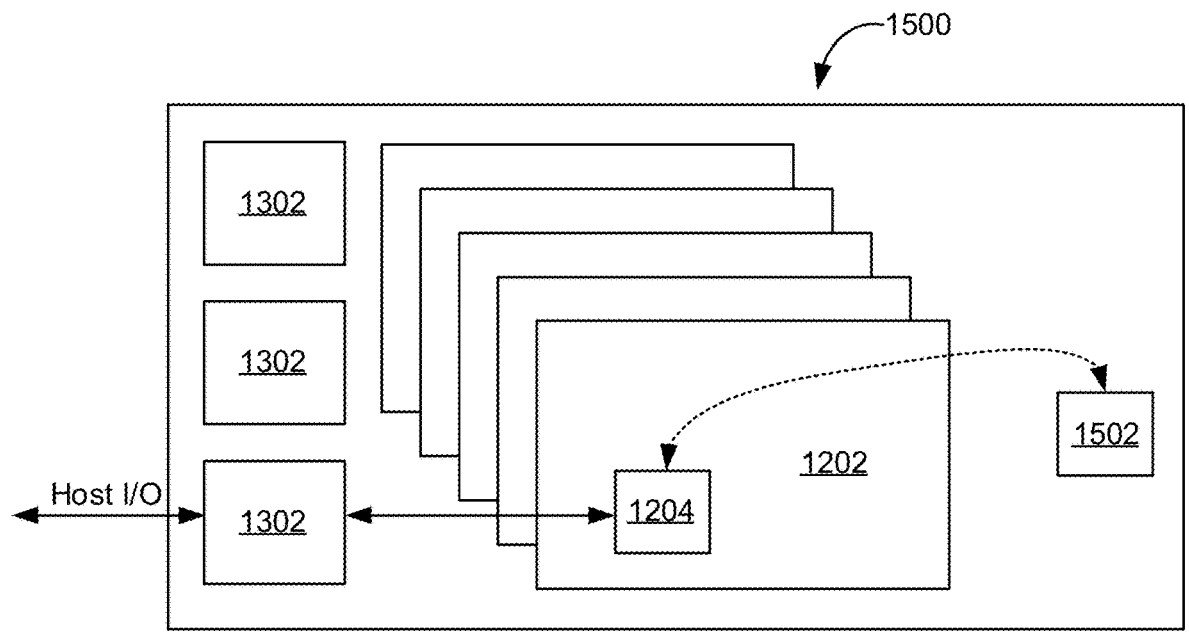
FIG. 15 is an exemplary storage controller, according to one embodiment.

FIG. 15 is an exemplary storage controller 1500 comprising thin provisioned volumes 1202 and a container volume (cVol) 1204. The storage controller 1400 may migrate the cVol 1204 to a new volume 1502 in response to determining that the container has terminated operations. The cVol 1204 may be available to another container. In some approaches, the cVol 1204 may be available to a different instance of the same container, another container, etc. In one approach, after migrating the cVol 1204 to a new volume 1502, the original physical LBAs may be returned to the parent TP volume inventory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a request for storage for a container;
determining whether a suitable thin provisioned volume currently exists based on criteria in the request;
in response to determining that a suitable thin provisioned volume currently exists, selecting an unused portion of the thin provisioned volume;
creating a container volume in the selected unused portion of the thin provisioned volume;
permitting input/output (I/O) to the container volume;
migrating data in the container volume to a new volume in response to determining that the container has terminated operations; and
releasing the selected unused portion of the thin provisioned volume in response to determining the container volume is no longer needed, thereby making storage space used by the container volume prior to the migrating available to another container.

2. The computer-implemented method of claim 1, comprising creating a new volume for storing the container in response to determining that no suitable thin provisioned volume currently exists.

3. The computer-implemented method of claim 1, comprising receiving a rebind request, and in response thereto, creating a new input/output session to the container volume.

4. The computer-implemented method of claim 1, wherein determining that a thin provisioned volume is suitable includes determining that an amount of available resources in the thin provisioned volume exceeds a cVol threshold.

5. The computer-implemented method of claim 4, comprising, after creating the container volume in the thin provisioned volume, sending a threshold breach notification when the amount of available resources in the thin provisioned volume crosses a first threshold of the thin provisioned volume.

6. The computer-implemented method of claim 5, comprising sending a temporary resource exhaustion notification when the amount of available resources in the thin provisioned volume crosses a second threshold.

7. The computer-implemented method of claim 1, comprising provisioning additional physical blocks to the thin provisioned volume in response to determining that a usage thereof has exceeded a threshold.

8. A computer program product for fast provisioning of storage blocks in thin provisioned volumes, the computer program product comprising a computer readable storage medium having program instructions embodied therewith, the program instructions executable by a computer to cause the computer to:

receive, by the computer, a request for storage for a container;
determine, by the computer, whether a suitable thin provisioned volume currently exists based on criteria in the request;
in response to determining that a suitable thin provisioned volume currently exists, select, by the computer, an unused portion of the thin provisioned volume;
create, by the computer, a container volume in the selected unused portion of the thin provisioned volume;
permit, by the computer, input/output (I/O) to the container volume;
release, by the computer, the selected unused portion of the thin provisioned volume in response to determining the container volume is no longer needed;
migrate, by the computer, the container volume to a new volume in response to determining that the container has terminated operations; and
make, by the computer, the migrated container volume available to another container.

9. The computer program product of claim 8, comprising program instructions to cause the computer to create a new volume for storing the container in response to determining that no suitable thin provisioned volume currently exists.

10. The computer program product of claim 8, comprising program instructions to cause the computer to receive a rebind request, and in response thereto, create a new input/output session to the container volume.

11. The computer program product of claim 8, wherein determining that a thin provisioned volume is suitable includes determining that an amount of available resources in the thin provisioned volume exceeds a cVol threshold.

12. The computer program product of claim 11, comprising, after creating the container volume in the thin provisioned volume, sending a threshold breach notification when the amount of available resources in the thin provisioned volume crosses a first threshold of the thin provisioned volume.

13. The computer program product of claim 12, comprising program instructions to cause the computer to send a temporary resource exhaustion notification when the amount of available resources in the thin provisioned volume crosses a second threshold.

14. The computer program product of claim 8, comprising program instruction to cause the computer to provision additional physical blocks to the thin provisioned volume in response to determining that a usage thereof has exceeded a threshold.

15. A system, comprising:
a processor; and
logic integrated with the processor, executable by the processor, or integrated with and executable by the processor, the logic being configured to:
receive a request for storage for a container;
determine whether a suitable thin provisioned volume currently exists based on criteria in the request;
in response to determining that a suitable thin provisioned volume currently exists, select an unused portion of the thin provisioned volume;
create a container volume in the selected unused portion of the thin provisioned volume;
permit input/output (I/O) to the container volume;
release the selected unused portion of the thin provisioned volume in response to determining the container volume is no longer needed;

migrate data in the container volume to a new volume in response to determining that the container has terminated operations; and release the selected unused portion of the thin provisioned volume in response to determining the container volume is no longer needed, thereby making storage space used by the container volume prior to the migrating available to another container.

16. The system of claim 15, comprising logic configured to create a new volume for storing the container in response to determining that no suitable thin provisioned volume currently exists.

17. The system of claim 15, comprising logic configured to receive a rebind request, and in response thereto, create a new input/output session to the container volume.

18. The system of claim 15, wherein determining that a thin provisioned volume is suitable includes determining that an amount of available resources in the thin provisioned volume exceeds a cVol threshold.

* * * * *